(12) United States Patent
Takayanagi

(10) Patent No.: US 7,764,524 B2
(45) Date of Patent: Jul. 27, 2010

(54) INVERTER FOR DRIVING A LOAD INCLUDING A CAPACITIVE ELEMENT IN AN INPUT STAGE

(75) Inventor: Yoshinobu Takayanagi, Tokyo (JP)

(73) Assignee: TDK Corporation, Tokyo (JP)

( * ) Notice: Subject to any disclaimer, the term of this patent is extended or adjusted under 35 U.S.C. 154(b) by 452 days.

(21) Appl. No.: 11/878,728

(22) Filed: Jul. 26, 2007

(65) Prior Publication Data

US 2008/0049467 A1 Feb. 28, 2008

(30) Foreign Application Priority Data

Jul. 28, 2006 (JP) ............... 2006-206660

(51) Int. Cl.
    *H02H 7/122* (2006.01)
(52) U.S. Cl. .................... 363/56.03; 363/49
(58) Field of Classification Search .......... 363/49, 363/56.03, 56.07, 56.1, 98, 132
    See application file for complete search history.

(56) References Cited

U.S. PATENT DOCUMENTS

| | | | |
|---|---|---|---|
| 4,586,118 A | * | 4/1986 | Mihalka ............ 363/17 |
| 4,763,238 A | * | 8/1988 | Maige ............ 363/56.1 |
| 4,937,724 A | * | 6/1990 | Nakajima ............ 363/56.1 |

FOREIGN PATENT DOCUMENTS

| | | |
|---|---|---|
| JP | A-54-30431 | 3/1979 |
| JP | A-54-038522 | 3/1979 |
| JP | A-02-087975 | 3/1990 |
| JP | A-04-021363 | 1/1992 |
| JP | A-07-015974 | 1/1995 |
| JP | A-11-046483 | 2/1999 |
| JP | A-2001-268928 | 9/2001 |
| JP | B2 3362666 | 10/2002 |
| JP | A 2002-335678 | 11/2002 |
| JP | A-2005-269854 | 9/2005 |

* cited by examiner

*Primary Examiner*—Jeffrey L Sterrett
(74) *Attorney, Agent, or Firm*—Oliff & Berridge, PLC

(57) ABSTRACT

The present invention provides an inverter with a simple configuration capable of preventing occurrence of excessive rush current. A current detection circuit detects an AC output current flowing out from an output filter circuit. When the absolute value of the AC output current becomes equal to or larger than a threshold, a reset control unit and a drive pulse generation circuit control a DC/AC inverter so as to re-start operation after the AC output voltage becomes 0V. For example, even in the case where a capacitive load is connected during operation of the inverter or in the case where the load includes a standby circuit, excessive rush current is prevented.

15 Claims, 7 Drawing Sheets

INVERTER FOR DRIVING A LOAD INCLUDING A CAPACITIVE ELEMENT IN AN INPUT STAGE

CROSS REFERENCE TO RELATED APPLICATIONS

The present invention contains subject matter related to Japanese Patent Application JP 2006-206660 filed in the Japanese Patent Office on Jul. 28, 2006, the entire contents of which being incorporated herein by reference.

BACKGROUND OF THE INVENTION

1. Field of the Invention

The present invention relates to an inverter for converting DC voltage to AC voltage and outputting the AC voltage.

2. Description of the Related Art

In the case of connecting an electronic device having a so-called capacitor-input-type rectifier including a capacitor on its input side as a load on an inverter for converting DC voltage to AC voltage, at the time of rapidly charging the capacitor to start the inverter, there is a case that excessive rush current having a timing waveform of output current as shown in FIG. 7 as an example flows. When such excessive rush current flows, a semiconductor device or the like on a current path may be broken down or a mechanical contact such as a relay contact may be melted.

Japanese Unexamined Patent Application Publication No. 2002-335678 discloses an inverter in which generation of excessive rush current upon start of an inverter is prevented by making output AC voltage having a sine wave always start from 0V at the time of starting the inverter as shown in FIG. 8.

Japanese Patent No. 3,362,666 also discloses an inverter. AC output current from the inverter is detected at any time. In the case where the AC output current becomes larger than a predetermined first threshold, before the AC output current reaches a second threshold larger than the first threshold, flow of excessive current is allowed for a while.

SUMMARY OF THE INVENTION

In Japanese Unexamined Patent Application Publication No. 2002-335678, since the capacitor as a load can be charged from 0V at the time of starting the inverter, it is expected that generation of excessive rush current upon start can be prevented. However, for example, in the case of connecting a capacitor-input-type electronic device during operation of the inverter, the device cannot be always connected at the timing of 0V of the output AC voltage. Consequently, generation of excessive rush current cannot be always prevented. In addition, many electronic devices (such as PC (Personal Computer) and TV (TeleVision) apparatus) in recent years include standby circuits to reduce standby current as much as possible. In the case of connecting such an electronic device, the power supply line of the inverter is connected to a main power supply circuit in the electronic device during transition of the electronic device from standby mode to operation mode. Consequently, in many cases, excessive rush current is generated.

In the configuration of Japanese Patent No. 3,362,666, flow of excessive rush current has to be allowed for a while, so that devices having a margin of electric property have to be applied as devices in the apparatus (for example, power devices such as an FET (Field Effect Transistor), an IGBT (Insulated Gate Bipolar Transistor), and a diode). Therefore, the devices have over-specifications as compared with those used in a steady mode. It causes increase in the cost and size of the apparatus.

As described above, it is difficult for the conventional techniques to reliably prevent generation of excessive rush current with a simple configuration irrespective of the operation state of the apparatus.

It is desirable to provide an inverter capable of preventing generation of excessive rush current with a simple configuration.

An inverter of an embodiment of the present invention is provided to drive a load including a capacitive element in an input stage and includes: an inverter circuit converting a DC input voltage to an AC output voltage; current detecting means for detecting AC output current flowing out from the inverter circuit; and control means, in the case where detected AC output current comes to have a predetermined value or larger, for controlling the inverter circuit so as to reset the AC output voltage to 0V and then re-start its operation.

In the inverter according to the embodiment of the invention, a DC input voltage is converted to an AC output voltage by the inverter circuit, and AC output current flowing out from the inverter circuit is detected by the current detecting means. In the case where detected AC output current comes to have a predetermined value or larger, the inverter circuit is controlled so as to reset the AC output voltage to 0V and then re-start its operation.

The inverter of the embodiment of the invention may include a full-bridge-type switching circuit having four switching elements, and a pair of charge pump circuits each connected to each of a pair of high-side switching elements of the four switching elements. In this case, preferably, the control means controls the inverter circuit so that the AC output voltage immediately after re-start has a polarity opposite to that of output voltage immediately before reset. In such a configuration, it is unnecessary to invert the polarity of voltage supplied from the charge pump circuit to the pair of switching elements on the high voltage side. Consequently, the operation can be re-started quicker as compared with the case of re-starting operation with the polarity opposite to that of the output voltage immediately before reset.

For example, a pair of independent power supply circuits each may be connected to each of the pair of high-side switching elements. In this case, in a manner opposite to the above, the control means may control so that the AC output voltage immediately after re-start comes to have a polarity opposite to that of the voltage immediately before reset. An "independent power supply circuit" is different from, for example, a power supply circuit of the charge pump circuit or the like and does not generate a voltage based on another power supply voltage, but denotes a power supply circuit generating a voltage independently of other power supply voltages.

When the inverter circuit includes a full-bridge-type switching circuit having a pair of first switching elements for switching polarity of the AC output voltage and a pair of second switching elements for generating pulse voltage on the basis of the DC input voltage, and the first switching element is constructed by a bipolar transistor, it is preferable to control so that AC output voltage immediately after re-start has a polarity opposite to that of output voltage immediately before reset. In such a configuration, to prevent the pair of first switching elements from performing the same operation at the time of re-start of operation of the inerter circuit, one of the first switching elements is turned off and the other one is turned on. Consequently, a burden is not placed on the bipolar transistors whose operation frequency has the upper limit value, and the operation can be re-started quicker as compared with the case of re-starting operation with the same polarity as that of the voltage immediately before reset.

In the inverter of the present invention, when the number of times of re-starting times in the inverter circuit reaches a predetermined number of times, the control means may stop the operation of the circuit. In such a configuration, in the case where the operation is frequently re-started for some trouble, destruction of a device, generation of heat, and the like due to excessive rush current frequently passed can be avoided. In this case, it if more preferable to stop the operation when the number of re-start times of operation reaches the predetermined number of times within the predetermined time. In the configuration, erroneous stop in the case such that the number of re-start times reaches the predetermined number of times after lapse of long time can be avoided.

In the inverter of the embodiment of the invention, AC output current flowing out from the inverter circuit can be detected by the current detecting means. In the case where detected AC output current comes to have a predetermined value or larger, the inverter circuit is controlled so as to reset the AC output voltage to 0V and then re-start its operation. Therefore, for example, in the case of connecting a load including a capacitive element in an input stage during operation of the inverter or in the case where the load includes a standby circuit, generation of rush current can be prevented. Since generation of rush current can be prevented, a device having a margin of electric property smaller than that of a conventional device can be applied as a device in the inverter. Thus, generation of excessive rush current can be prevented with a simple configuration.

Other and further objects, features and advantages of the invention will appear more fully from the following description.

DETAILED DESCRIPTION OF THE PREFERRED EMBODIMENTS

The best modes for carrying out of the present invention (hereinbelow, simply called embodiments) will be described in detail hereinbelow with reference to the drawings.

Figure 1:
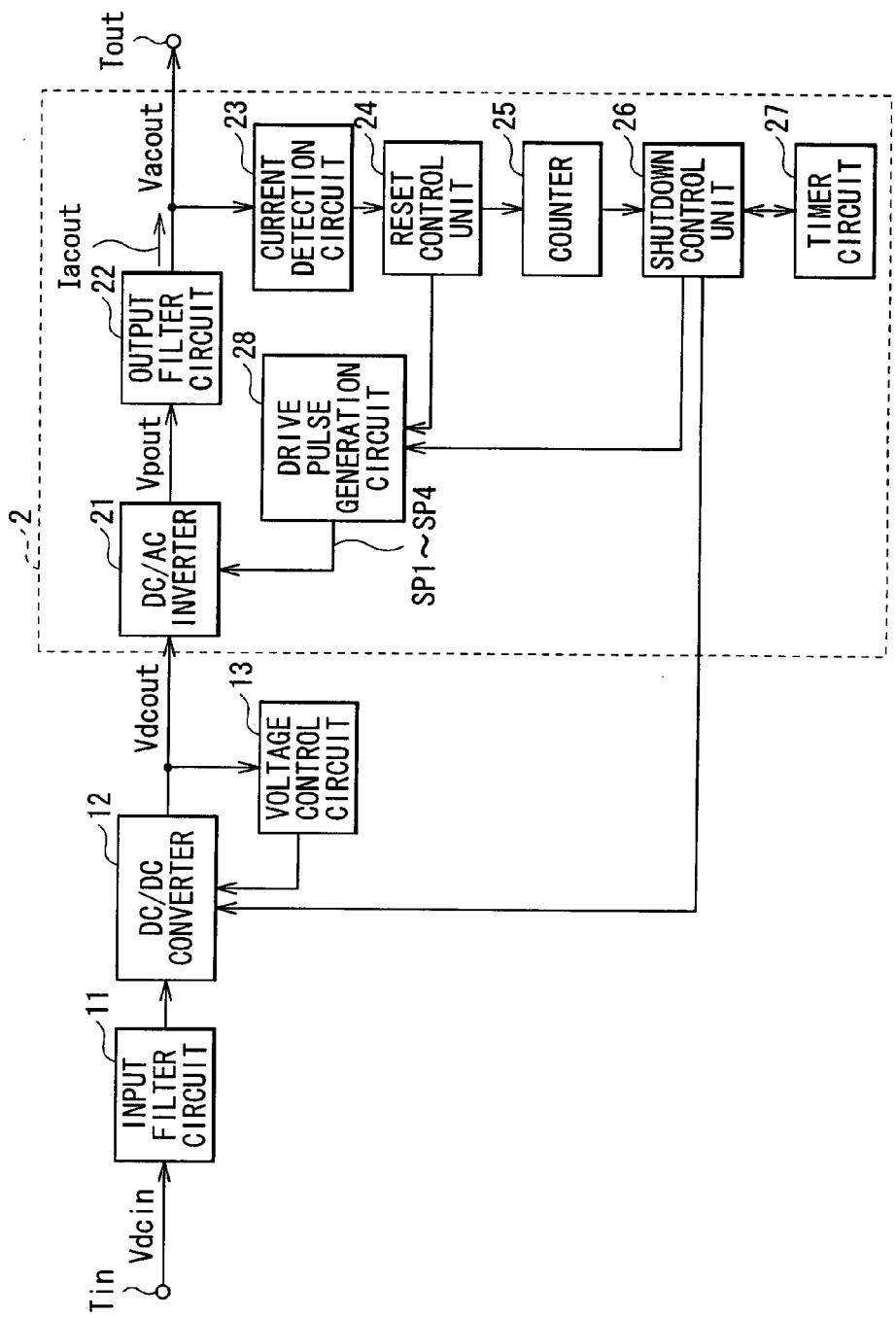
FIG. 1 is a circuit block diagram showing the configuration of a power supply system including an inverter according to an embodiment of the invention.

FIG. 1 shows the configuration of a power supply system including an inverter according to an embodiment of the present invention. The power supply system generates an AC output voltage Vacout on the basis of a DC input voltage Vdcin input from an input terminal Tin, outputs the AC output voltage Vacout from an output terminal Tout, and drives a load 3 of a capacitor-input-type rectifier constructed by, for example, a PC, a TV apparatus, and the like, and is applied to, for example, a vehicle or the like. The power supply system has an input filter circuit 11, a DC/DC converter 12, a voltage control circuit 13, and an inverter 2.

The input filter circuit 11 is a circuit eliminating noise of the DC input voltage Vdcin input from the input terminal Tin and is constructed by, for example, a choke coil, a capacitor, and the like.

The DC/DC converter 12 converts the DC input voltage Vdcin passed through the input filter circuit 11 to a DC output voltage Vdcout. The DC/DC converter 12 includes, for example, a switching element, a transformer, and the like. The voltage control circuit 13 detects, at any time, the DC output voltage Vdcout output from the DC/DC converter 12 and controls the DC/DC converter 12 so that the DC output voltage Vdcout maintains a predetermined value. As a concrete control method, for example, the on duty ratio of the switching element is controlled in accordance with the magnitude of the DC output voltage Vdcout.

The inverter 2 generates the AC output voltage Vacout of the basis of the DC output voltage Vdcout output from the DC/DC converter 12 and outputs the AC output voltage Vacout from the output terminal Tout. The inverter 2 has a DC/AC inverter 21, an output filter circuit 22, a current detection circuit 23, a reset control unit 24, a counter 25, a shutdown control unit 26, a timer circuit 27, and a drive pulse generation circuit 28.

The DC/AC inverter 21 generates a pulse output voltage Vpout having a pulse-shaped voltage waveform on the basis of the DC output voltage Vdcout. The DC/AC inverter 21 will be described in detail later.

The output filter circuit 22 generates the AC output voltage Vacout having a sine wave on the basis of the pulse output voltage Vpout output from the DC/AC inverter 21 and is constructed by, for example, a choke coil, a capacitor, and the like.

The current detection circuit 23 detects, at any time, an AC output current Iacout flowed from the output filter circuit 22 and, in the case where the absolute value of the AC output current Iacout becomes excessive and equal to or larger than a predetermined threshold Ith which will be described later, outputs an excessive current detection signal indicative of the fact to the reset control unit 24.

In the case where the excessive current detection signal is output from the detection current circuit 23, the reset control unit 24 controls the drive pulse generation circuit 28 to be described later to once drop an output voltage (pulse output voltage Vpout) from the DC/AC inverter 21 to 0V (reset the operation of the DC/AC inverter 21) and, after that, re-start the operation. In the case where the operation of the DC/AC inverter 21 is re-started, the reset control unit 24 outputs a reset signal indicative of the re-start to the counter 25.

The counter 25 counts the number of generation times of the reset signal output from the reset control unit 24 (the number of re-starting times of operation of the DC/AC inverter 21), and outputs the count value to the shutdown control unit 26.

In the case where the number of generation times of the reset signal output from the counter 25 reaches a predetermined number of times, the shutdown control unit 26 controls the operation of the DC/DC converter 12 and the drive pulse generation circuit 28 so that the operation of the DC/DC converter 12 and the drive pulse generation circuit 28 stops. The timer circuit 27 measures predetermined time lapsed since a first reset signal as a trigger output from the counter 25 is generated. When the number of generation times of the reset signal reaches the predetermined number of times within the predetermined time, the shutdown control unit 26 stops the operation of the DC/DC converter 12 and the DC/AC inverter 21.

The drive pulse generation circuit 28 generates a drive pulse for performing PWM (Pulse Width Modulation) on the switching element (which will be described later) in the DC/AC inverter 21, thereby controlling the magnitude and cycle of the pulse output voltage Vpout from the DC/AC inverter 21 and the AC output voltage Vacout from the output filter circuit 22.

Figure 2:
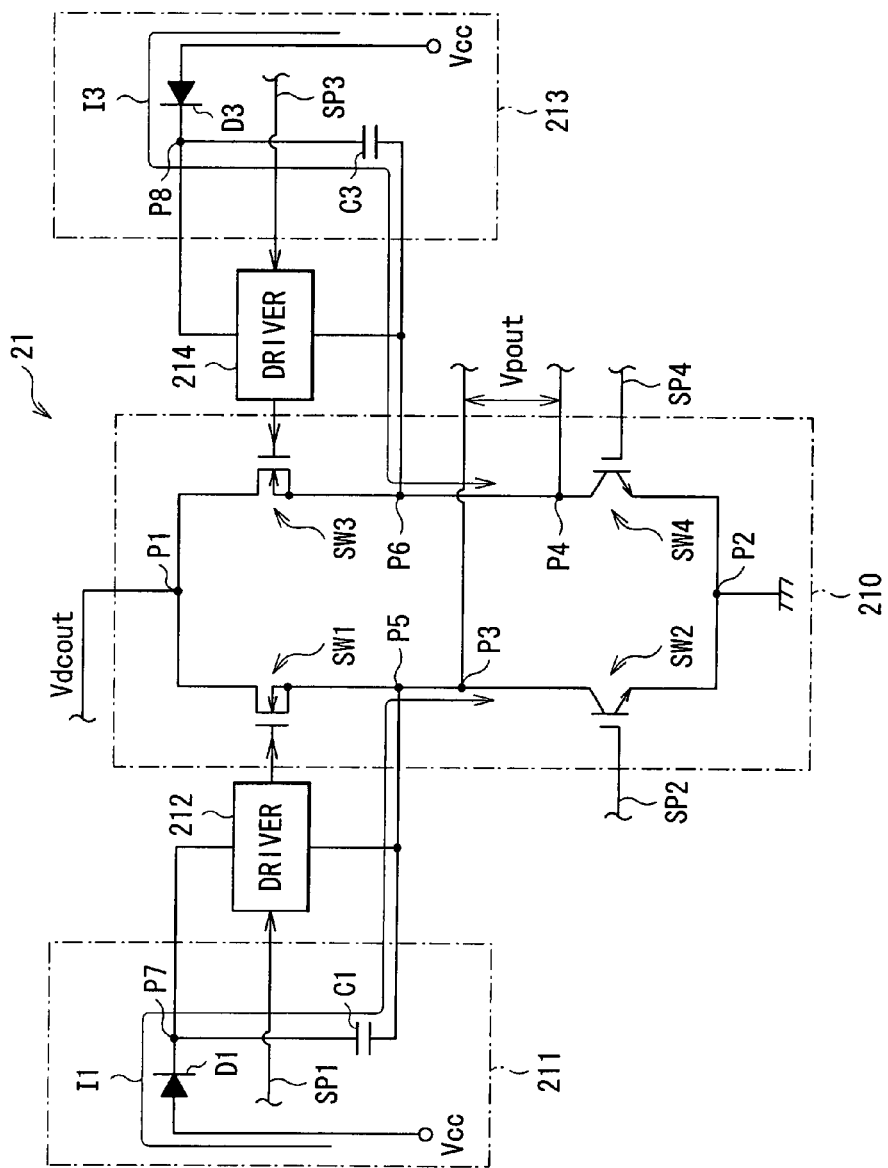
FIG. 2 is a circuit diagram showing the configuration of a DC/AC inverter shown in FIG. 1.

Reference to FIG. 2, the details of the circuit configuration of the DC/AC inverter 21 will be described. The DC/AC inverter 21 has a full-bridge-type switching circuit 210 including four switching elements SW1 to SW4, two charge pump circuits 211 and 213, and two drivers 212 and 214.

The switching elements SW1 and SW3 are constructed by N-channel-type MOS-FETs (Metal Oxide Semiconductor-Field Effect Transistors). The gate of the switching element SW1 is connected to the output terminal of the driver 212, the source is connected to connection points P5 and P3, and the drain is connected to a power supply line of the DC output voltage Vdcout via a connection point P1. The gate of the switching element SW3 is connected to the output terminal of the driver 214, the source is connected to connection points P6 and P4, and the drain is connected to the power supply line of the DC output voltage Vdcout via the connection point P1. Each of the switching elements SW1 and SW3 plays the role of, as will be specifically described later, generating the pulse output voltage Vpout from the DC output voltage Vdcout by its on/off operation.

On the other hand, the switching elements SW2 and SW4 are constructed by NPN-type IBGTs. To the gate of the switching element SW2, a drive pulse signal SP2 from the drive pulse generation circuit 28 which will be described later is input. The emitter of the switching element SW2 is grounded via a connection point P2, and the collector is connected to the connection points P3 and P5. To the gate of the switching element SW4, a drive pulse signal SP4 from the drive pulse generation circuit 28 which will be described later is input. The emitter of the switching element SW4 is grounded via the connection point P2, and the collector is connected to the connection points P4 and P5.

The charge pump circuit 211 has a diode D1 and a capacitor C1. The anode of the diode D1 is connected to a power supply Vcc for driving the gates of the switching elements SW2 and SW4, and the cathode is connected to one end of the capacitor C1 and a high-voltage-side input terminal of the driver 212, and the other end of the capacitor C1 is connected to a low-voltage-side input terminal of the driver 212 and the connection point P5. The charge pump circuit 213 similarly has a diode D3 and a capacitor C3. The anode of the diode d3 is connected to the power supply Vcc, the cathode is connected to one end of the capacitor C3 and a high-voltage-side input terminal of the driver 214, and the other end of the capacitor C3 is connected to a low-voltage-side input terminal of the driver 214 and the connection point P6. With such a configuration, the charge pump circuits 211 and 213 function as a booster circuit generating a voltage that drives the drivers 212 and 214 and the gates of the switching elements SW1 and SW3 by accumulating charges in the capacitors C1 and C3 by current paths I1 and I3 shown in the diagram on the basis of the power supply Vcc.

The drivers 212 and 214 drive the switching elements SW1 and SW3 on the basis of drive pulse signals SP1 and SP3 from the drive pulse generation circuit 28, respectively.

The DC/AC inverter 21 and the output filter circuit 22 correspond to an example of "an inverter circuit" in the present invention, and the reset control unit 24, the counter 25, the shutdown control unit 26, the timer circuit 27, and the drive pulse generation circuit 28 correspond to an example of "control means" in the invention. The switching elements SW1 and SW3 correspond to an example of "a pair of switching elements on the high voltage side" and "a pair of second switching elements" in the invention. The switching elements SW2 and SW4 correspond to an example of "a pair of first switching elements" in the invention.

Next, the operation of the power supply system having the above configuration will be specifically described with reference to FIGS. 1 to 4.

First, the basic operation of the power supply system including the inverter 2 of the embodiment will be described with reference to FIGS. 1 to 3.

Figure 3:
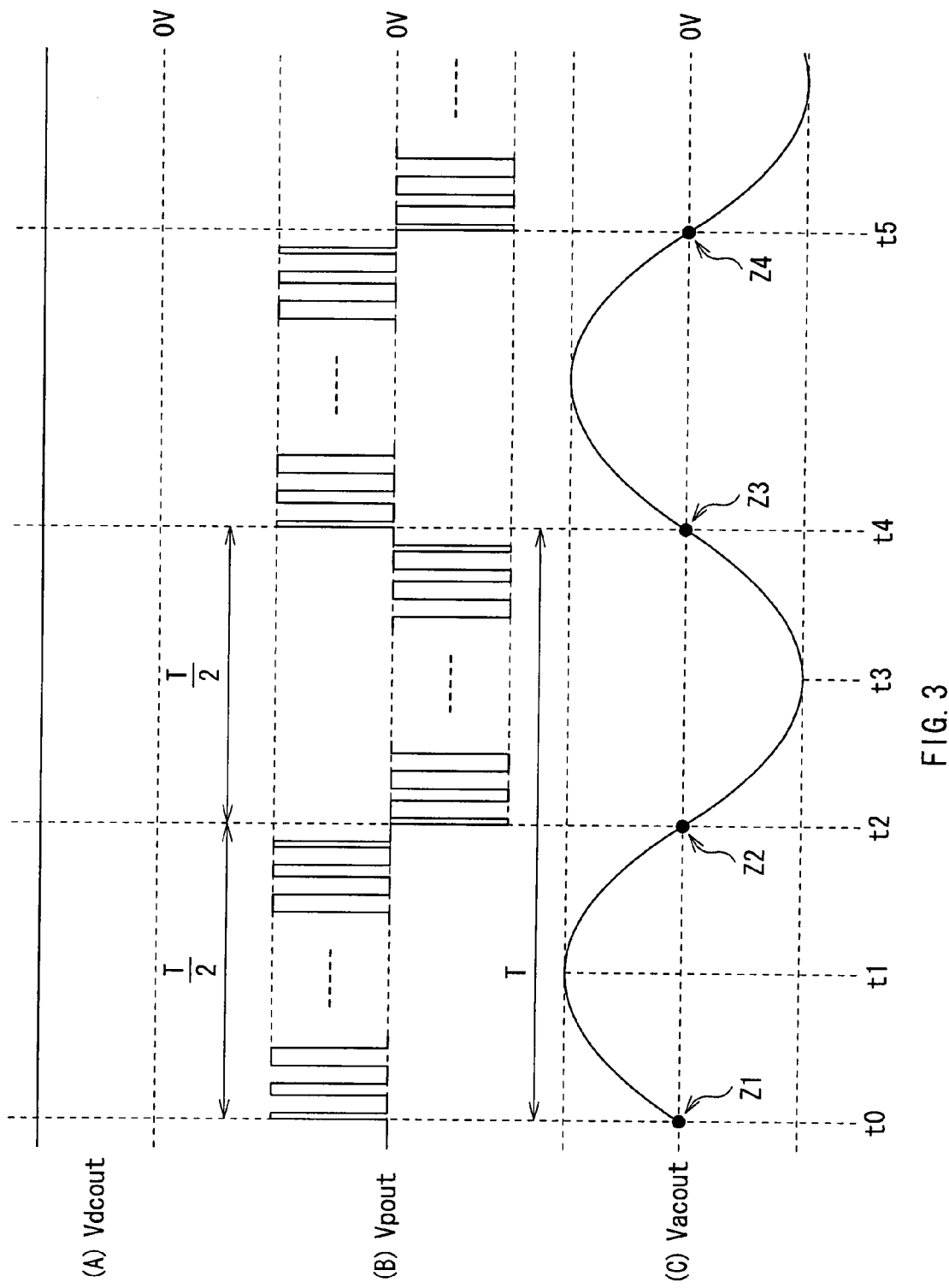
FIG. 3 is a timing waveform chart illustrating basic operation of the inverter.

FIG. 3 is a timing waveform chart showing an example of the basic operation of the inverter 2. (A) shows the DC output voltage Vdcout, (B) shows the pulse output voltage Vpout, and (C) shows the AC output voltage Vacout.

First, when the DC input voltage Vdcin is input from the input terminal Tin, noise is eliminated by the input filter circuit 11, the DC input voltage Vdcin is converted to the predetermined DC output voltage Vdcout by the DC/DC converter 12 and the voltage control circuit 13, and the DC output voltage Vdcout is input to the DC/AC inverter 21 in the inverter 2.

In the DC/AC inverter 21, the switching elements SW1 to SW4 in the switching circuit 210 perform predetermined PWM operation by the drive pulses SP1 to SP4 output from the drive pulse generation circuit 28 and drive signals from the drivers 212 and 214 receiving power from the charge pump circuits 211 and 213, and the pulse output voltage Vpout is generated on the basis of the DC output voltage Vdcout supplied from the connection points P1 and P2 and is output from the connection points P3 and P4.

Concretely, in the case of outputting the pulse output voltage Vpout of the positive polarity using the connection point P4 as a reference, the switching elements SW2 and SW3 are always in an off state and the switching element SW4 switching the polarity of the pulse output voltage Vpout (and the AC output voltage Vacout) is always in the on state. On the other hand, the switching element SW1 performs the PWM operation.

Therefore, as shown by timings t0 to t1 in FIG. 3, the pulse output voltage Vpout as shown in FIG. 3 (B) is generated on the basis of the predetermined DC output voltage Vdcout (FIG. 3 (A)). The pulse output voltage Vpout is controlled so that the pulse width gradually increases (so that the duty ratio increases) in the period of the timing t0 to timing t1. As a result, the AC output voltage Vacout output from the output filter circuit 22 has a sine wave which crosses a zero cross point Z1 of 0V at the timing t0 and monotonously increases as shown in FIG. 3 (C).

In the period of timing t1 to timing t2, the pulse output voltage Vpout is controlled so that the pulse width of the pulse output voltage Vpout gradually decreases (so that the duty ratio gradually decreases). As a result, the AC output voltage Vacout has a sine wave which monotonously decreases and crosses a zero cross point Z2 at the timing t2 as shown in FIG. 3 (C).

In the period of timing t2 to timing t4, a pulse output voltage Vpout having the negative polarity using the connection point P4 as a reference is output. Concretely, the switching elements SW1 and SW4 are always in an off state and the switching element SW2 switching the polarity of the pulse output voltage Vpout (and the AC output voltage Vacout) is always in the on state. On the other hand, the switching element SW3 performs the PWM operation. Therefore, as shown in FIGS. 3 (B) and (C), the pulse output voltage Vpout and the AC output voltage Vacout having the negative polarity are generated. The period of timing t0 to timing t4 corresponds to an operation cycle T of the pulse output voltage Vpout and the AC output voltage Vacout.

The operation after the timing t4 is similar to the above. That is, in the period of timing t4 to timing t5, the pulse output voltage Vpout and the AC output voltage Vacout having the positive polarity are generated. In the "T/2" cycle from the timing t5, the pulse output voltage Vpout and the AC output voltage Vacout having the negative polarity are generated.

As described above, by the pulse output voltage Vpout output from the DC/AC inverter 21, the AC output voltage Vacout output from the output filter circuit 22, and the AC output voltage Vacout output from the output terminal Tout, the load 3 is driven.

Figure 4:
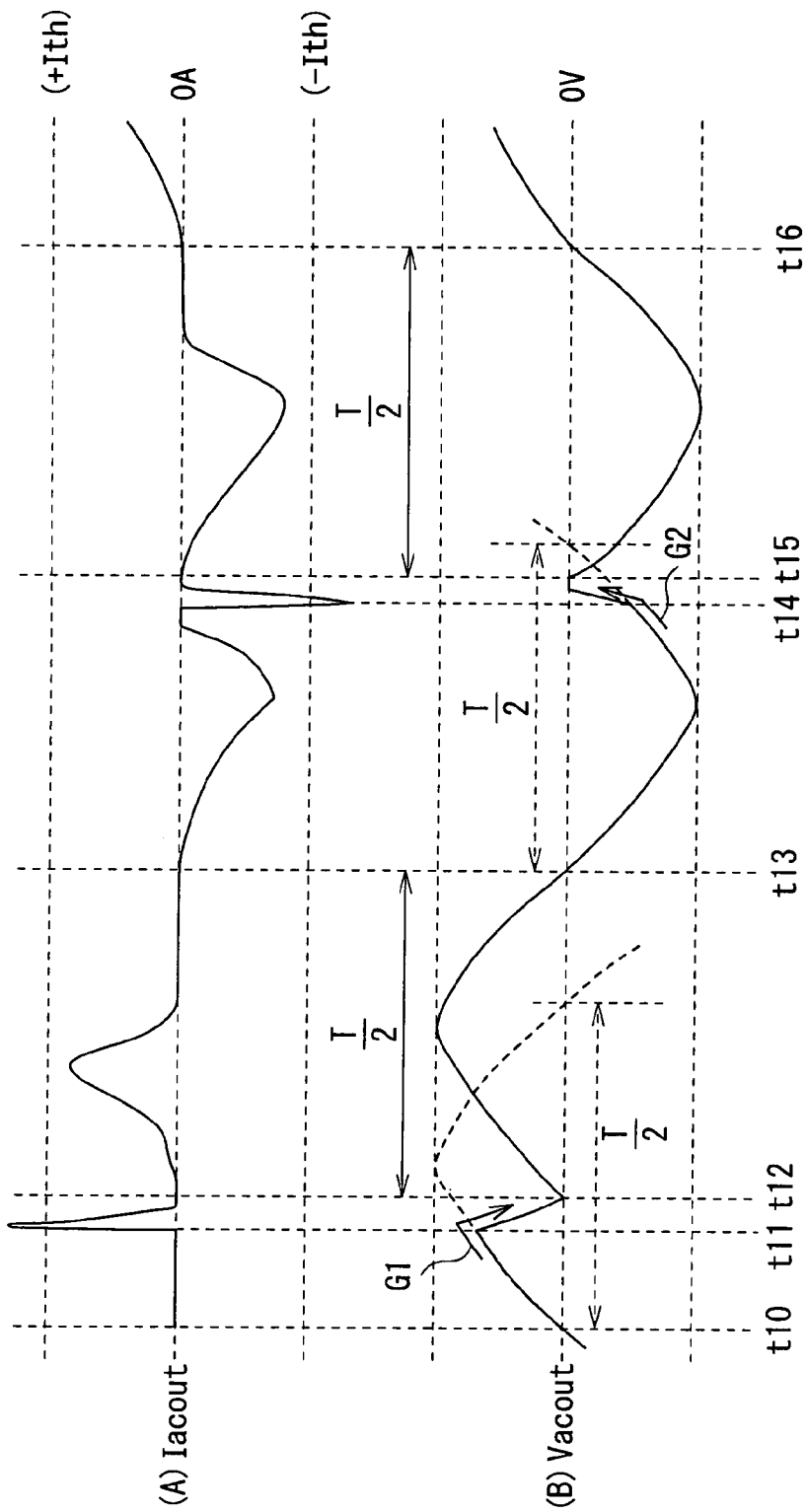
FIG. 4 is a timing waveform chart illustrating reset control operation in the inverter.

Reference to FIGS. 1, 2, and 4, the reset control operation of the DC/AC inverter 21 as the feature operation of the inverter 2 will now be described.

FIG. 4 is a timing waveform chart showing an example of the reset control operation of the inverter 2. (A) shows the AC output current Iacout, and (B) shows the AC output voltage Vacout.

First, in the inverter 2 of the embodiment, the AC output current Iacout flowed from the output filter circuit 22 is detected by the current detection circuit 23 at any time as shown in FIG. 4 (A).

In the case where a capacitor-input-type electronic device is connected as the load 3 during the operation of the inverter 2 or in the case where an electronic device provided with a standby circuit such as a PC or a TV apparatus is connected as the load 3 at the timing t11 as an example, excessive rush current flows from the inverter 2 toward a not-shown input-side capacitor in the load 3. Therefore, when the value of the AC output current Iacout is equal to or larger than a threshold (+Ith) and excessive at the timing t11 as shown in FIG. 4 (A), an excessive current detection signal is output from the current detection circuit 23 to the reset control unit 24.

It makes the reset control unit 24 control the operation of the drive pulse generation circuit 28 so that the output voltage (pulse output voltage Vpout) of the DC/AC inverter 21 and the AC output voltage Vacout based on the pulse output voltage Vpout become 0V as shown by arrow G1 in FIG. 4 (B) (so that the operation of the DC/AC inverter 21 is reset). Concretely, the switching elements SW1 and SW3 are turned off by the drive pulses SP1 to SP4 and the switching elements SW2 and SW4 are turned on. After the AC output voltage Vacout becomes 0V at timing t12, the reset control unit 24 controls the operation of the drive pulse generation circuit 28 with the drive pulses SP1 to SP4 so that the switching elements SW1 to SW4 re-start the normal operation and the DC/AC inverter 21 re-starts the normal operation. Therefore, as shown in FIG. 4 (B), after the timing t12, the AC output voltage Vacout having a sine wave like the original one is output, and the period of timing t12 to timing t13 is the half of the new operation cycle T. Each time the DC/AC inverter 21 re-starts the operation as described above (the operation is reset), a reset signal is output from the reset control unit 24 to the counter 25.

In the inverter 2 of the embodiment, when the DC/AC inverter 21 re-starts the operation, for example, as shown in FIG. 4 (B), the AC output voltage Vacout immediately after re-start of the operation has the same polarity as that of the voltage immediately before reset (the AC output voltage Vacout in the period of timing t10 to timing t11). Therefore, it is unnecessary for the charge pump circuits 211 and 213 to change the charging timing of the capacitors C1 and C3 and to invert the polarity of a signal supplied to the drivers 212 and 214. The operation is re-started quicker than that in the case of re-starting the operation with the polarity opposite to that of the voltage immediately before reset.

Subsequently, the operation after the timing t13 becomes normal and, as shown in FIG. 4 (B), the AC output voltage Vacout having the negative polarity is generated.

Also in the case where the value of the AC output current Iacout becomes excessive and equal to or larger than the threshold (−Ith) on the negative polarity side as shown in FIG. 4 (A) at timing t14 as an example, similarly, the excessive current detection signal is output from the current detection circuit 23 to the reset control unit 24. The reset control unit 24 controls the operation of the drive pulse generation circuit 28 so that the AC output voltage Vacout becomes 0V as shown by arrow G2 in FIG. 4 (B). The DC/AC inverter 21 is controlled to re-start the normal operation at timing t15. As shown in FIG. 4 (B), after timing t15, the AC output voltage Vacout having a sine wave like the original one is output. The period of timing t15 to timing t16 is equal to the half of a new operation cycle T.

In this case as well, when the DC/AC inverter 21 re-starts the operation, as shown in FIG. 4 (B), the AC output voltage Vacout immediately after the operation re-start is controlled to have the same polarity as that of the voltage immediately before reset (the AC output voltage Vacout in the period of timing t13 to timing t14).

In the inverter 2 of the embodiment, in the case where the absolute value of the AC output current Iacout detected by the current detection circuit 23 becomes equal to or larger than the predetermined threshold value Ith and excessive, the DC/AC inverter 21 is controlled by the reset control unit 24 and the drive pulse generation circuit 28 so as to re-start the operation after the AC output voltage Vacout becomes 0V.

At this time, the counter 25 counts the number of generation times of the reset signal output from the reset control unit 24 (the number of re-starting times of the DC/AC inverter 21) at any time, and the count value is output to the shutdown control unit 26. The timer circuit 27 uses the first reset signal output from the counter 25 as a trigger and measures predetermined time since the signal is generated.

When the number of generation times of the reset signal reaches a predetermined number within the predetermined time, the shutdown control unit 26 controls the operation of the DC/DC converter 12 and the drive pulse generation circuit 28. As a result, the operation of the DC/DC converter 12 and the DC/AC inverter 21 stops.

Since the operation of the DC/DC converter 12 and the DC/AC inverter 21 is stopped in such a manner, in the case where the operation is frequently re-started for some trouble, destruction of a device, generation of heat, and the like due to excessive rush current frequently passed can be avoided. Since the operation is stopped when the number of re-start times of operation of the DC/AC inverter 21 reaches the predetermined number of times within the predetermined time, erroneous stop in the case such that the number of re-start times reaches the predetermined number of times after lapse of long time can be avoided.

As described above, in the embodiment, the AC output current Iacout flowed from the output filter circuit 22 is detected by the current detection circuit 23. In the case where the absolute value of the AC output current Iacout becomes equal to or larger than the predetermined threshold value Ith and excessive, the DC/AC inverter 21 is controlled by the reset control unit 24 and the drive pulse generation circuit 28 so as to re-start the operation after the AC output voltage Vacout becomes 0V. Consequently, for example, even in the case where the load 3 which is a capacitor-input-type rectifier is connected during operation of the inverter 2 and in the case where the load 3 includes a standby circuit, generation of rush current can be prevented reliably. Since generation of rush current can be prevented reliably, for example, an element having a margin of electric property smaller than that of the conventional one can be applied as an element in the inverter 2. Therefore, with a simple configuration, occurrence of excessive rush current can be reliably prevented irrespective of the operation state of the apparatus.

When the DC/AC inverter 21 re-starts the operation, the AC output voltage Vacout immediately after re-start of the operation comes to have the same polarity as that of the voltage immediately before reset. Consequently, it becomes unnecessary for the charge pump circuits 211 and 213 to invert the polarity of a signal to be supplied to the drivers 212 and 214. The operation can be re-started quicker than that in the case of re-starting the operation with the polarity opposite to that of the voltage immediately before reset.

In the case where the number of generation times of the reset signal reaches a predetermined number, the shutdown control unit 26 controls the operation of the DC/DC converter 12 and the drive pulse generation circuit 28 to stop the operation of the DC/DC converter 12 and the DC/AC inverter 21. In the case where the operation is frequently re-started due to some trouble (failure of a circuit or the like), destruction of a device, generation of heat, and the like caused by excessive rush current frequently passed can be avoided. Therefore, the reliability of the inverter 2 and, further, the whole power supply system can be improved.

Further, since the operation is stopped in the case where the number of operation re-start times of the DC/AC inverter 21 reaches a predetermined number within predetermined time, erroneous stop in the case such that the number of re-start times reaches the predetermined number of times after lapse of long time can be avoided. The reliability of the inverter 2 and, further, the whole power supply system can be further improved.

Although the present invention has been described by the embodiment, the invention is not limited to the embodiment but can be variously modified.

For example, the foregoing embodiment has been described with respect to the case where, in the DC/AC inverter 21, voltage is supplied to the drivers 212 and 214 and the switching elements SW1 and SW3 by the charge pump circuits 211 and 213 that generate voltage on the basis of the power supply Vcc. For example, like in a DC/AC inverter 21A shown in FIG. 5, voltage may be supplied from power supply circuits 215 and 216 independent of the other power supplies.

Figure 5:
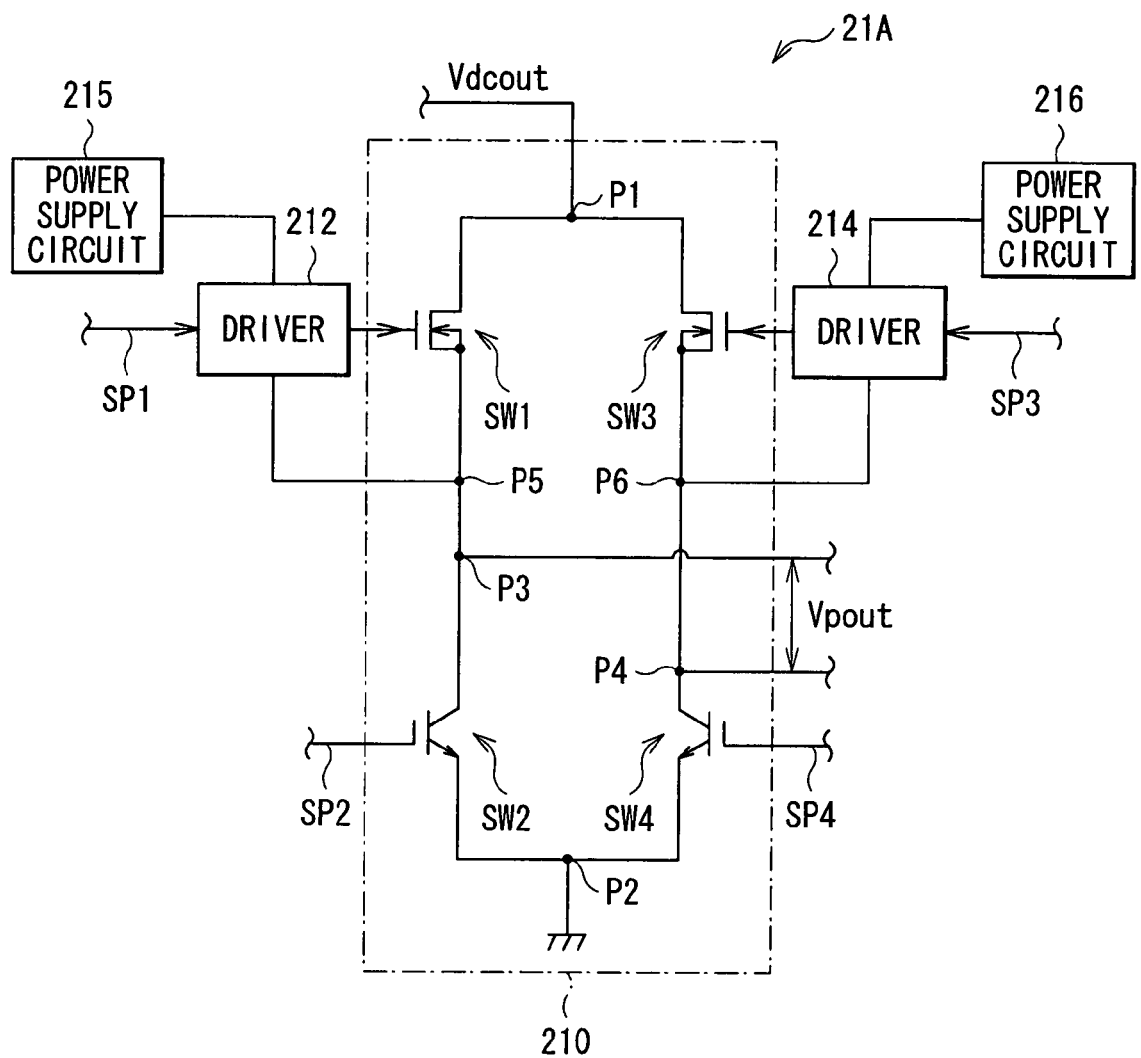
FIG. 5 is a circuit diagram showing the configuration of a DC/AC inverter as a modification of the present invention.
Figure 6:
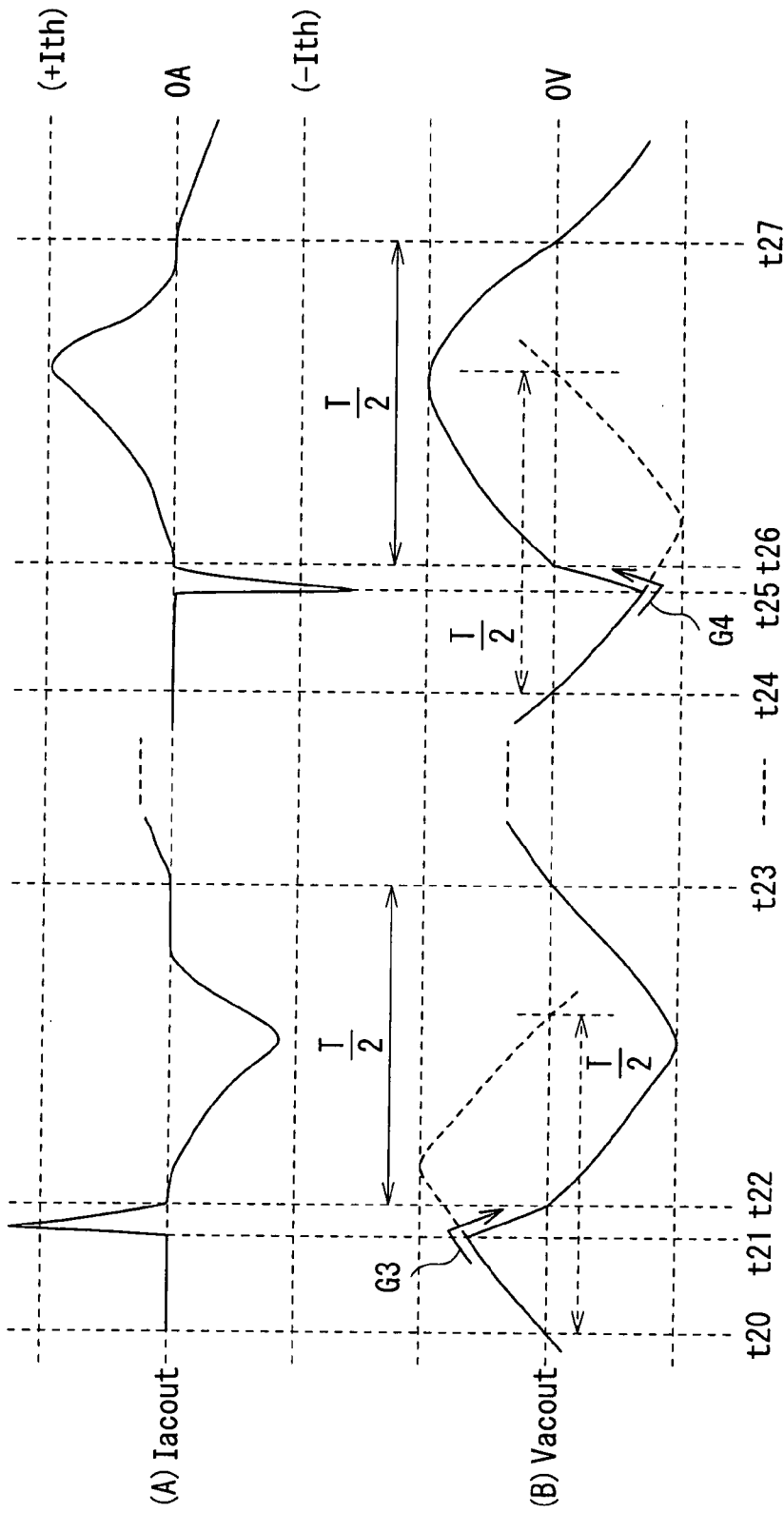
FIG. 6 is a timing waveform chart illustrating reset control operation in the modification of the invention.
Figure 7:
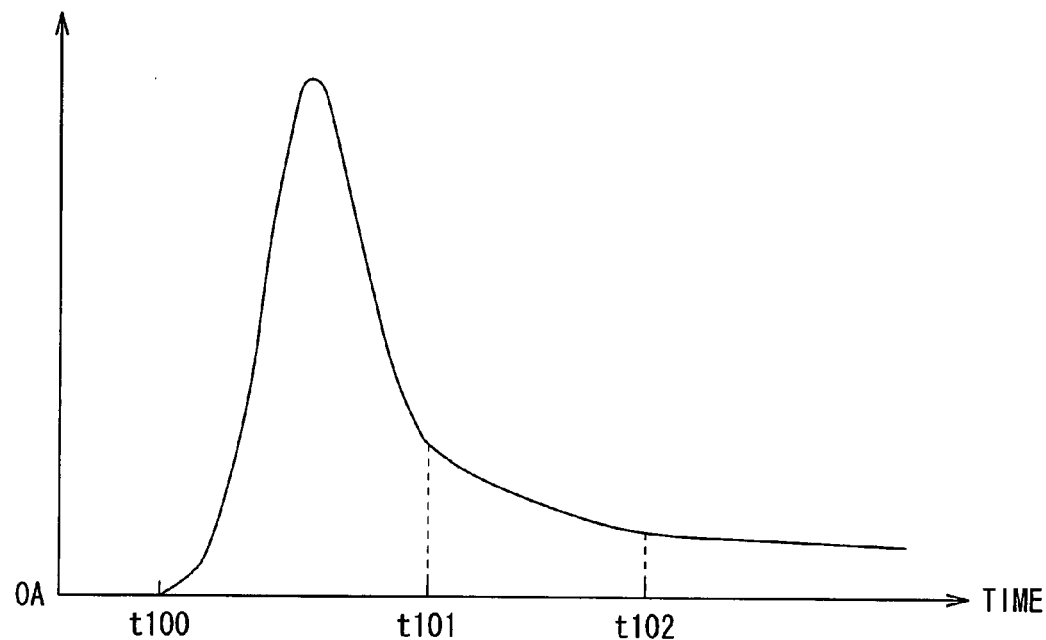
FIG. 7 is a timing waveform chart showing an example of a mode of rush current in a conventional inverter.
Figure 8:
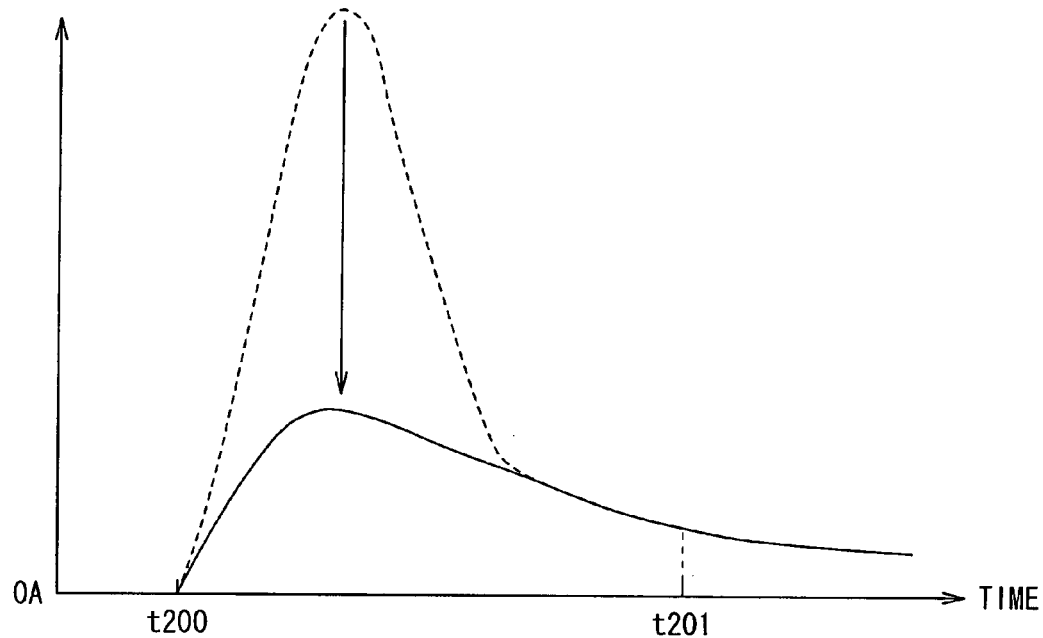
FIG. 8 is a timing waveform chart showing another example of the mode of the rush current in the conventional inverter.

In the embodiment, the case where, at the time of re-starting the DC/AC inverter 21, the AC output voltage Vacout immediately after re-start is set to have the same polarity as that of voltage immediately before reset has been described. However, for example, in the case where voltage is supplied to a switching element for generating the pulse output voltage Vpout (in this case, the switching elements SW1 and SW3) from an independent power supply circuit as shown in FIG. 5 and in the case where swiftness in re-start of operation is not emphasized, the AC output voltage Vacout immediately after re-start may have the polarity opposite to that of the voltage immediately before reset as shown in the timing chart of FIG. 6 (the period of timing t20 to t27). Concretely, it is also possible to set the AC output voltage Vacout shown by arrows G3 and G4 to 0V in the period of timing t21 to timing t22 and the period of timing t25 to timing t26 and, after that, re-start the operation with the polarity opposite to that of the voltage in the period of timing t20 to timing t21 and the period of timing t24 to timing t25.

For example, in the case where the DC/AC inverter 2 includes a full-bridge-type switching circuit and a switching element for switching the polarity of the AC output voltage Vacout (in this case, the switching elements SW2 and SW4) is constructed by a bipolar transistor (in this case, IGBT) as shown in FIG. 2, if swiftness in re-start of operation is not emphasized, it is preferable to re-start the operation by setting the polarity of the AC output voltage Vacout immediately after re-start to be opposite to that of the voltage immediately before reset. With such a configuration, at the time of re-start, the switching elements SW2 and SW4 are prevented from continuously operating. One of the switching elements SW2 and SW4 is turned off and the other one is turned on. Therefore, no burden is applied on a bipolar transistor whose operation frequency has an upper limit value. Consequently, as compared with the case of re-starting the operation with the same polarity as that of the voltage immediately before reset, the operation can be re-started promptly. Also in the case where the switching elements SW1 and SW3 switch the polarity and are constructed by bipolar transistors such as IGBTs, it is preferable to similarly re-start the operation by setting the polarity of the AC output voltage Vacout immediately after re-start to be opposite to that of the voltage immediately before reset.

The foregoing embodiment has been described with respect to the case where each of the DC/AC inverters 21 and 21A includes the full-bridge-type switching circuit 210. The configuration of the DC/AC inverter and the switching circuit is not limited to the above. For example, they may be constructed by, for example, a half-bridge-type switching circuit, or full-bridge control of irregular pulse width modulation may be employed.

Further, in the foregoing embodiment, the configuration of the inverter has been concretely described. The configuration of the inverter is not limited to the above. For example, depending on the application or the like, the counter 25, the shutdown control unit 26, and the timer circuit 27 may not be provided. In the case where the counter 25 and the shutdown control unit 26 are provided, the timer circuit 27 may not be provided.

Obviously many modifications and variations of the present invention are possible in the light of the above teachings. It is therefore to be understood that within the scope of the appended claims the invention may be practiced otherwise than as specifically described.

What is claimed is:

1. An inverter for driving a load including a capacitive element in an input stage, comprising:
   an inverter circuit converting a DC input voltage to an AC output voltage;
   current detecting means for detecting AC output current flowing out from the inverter circuit; and
   control means, in the case where the AC output current detected comes to have a predetermined value or larger, for controlling the inverter circuit so as to reset the AC output voltage to 0 volt and then re-start its operation,
   wherein the control means controls the inverter circuit so that the AC output voltage immediately after re-start has the same polarity as that of voltage immediately before reset.

2. The inverter according to claim 1, the AC output voltage indicating a sine wave.

3. The inverter according to claim 2, wherein the control means controls the inverter circuit, as a starting point is reset to 0 volt, to restart a normal operation by outputting the AC output voltage indicating the sine wave again.

4. The inverter according to claim 1, wherein the inverter circuit includes:
   a full-bridge-type switching circuit having four switching elements; and
   a pair of charge pump circuits each connected to each of a pair of high-side switching elements of the four switching elements.

5. The inverter according to claim 1, wherein the inverter circuit includes:
   a full-bridge-type switching circuit having four switching elements; and
   a pair of independent power supply circuits each connected to each of a pair of high-side switching elements of the four switching elements.

6. The inverter according to claim 1, wherein the inverter circuit includes a full-bridge-type switching circuit having a pair of first switching elements for switching polarity of the AC output voltage and a pair of second switching elements for generating pulse voltage on the basis of the DC input voltage, and
   each of the first switching elements is constructed by a bipolar transistor.

7. The inverter according to claim 1, wherein when the number of times of re-starting in the inverter circuit reaches a predetermined number of times, the control means stops operation of the inverter circuit.

8. The inverter according to claim 7, wherein when the number of times of re-starting reaches the predetermined number of times within a fixed period, the control means stops operation of the inverter circuit.

9. An inverter for driving a load including a capacitive element in an input stage, comprising:
   an inverter circuit converting a DC input voltage to an AC output voltage;
   current detecting means for detecting AC output current flowing out from the inverter circuit; and
   control means, in the case where the AC output current detected comes to have a predetermined value or larger, for controlling the inverter circuit so as to reset the AC output voltage to 0 volt and then re-start its operation,
   wherein the control means controls the inverter circuit so that the AC output voltage immediately after re-start has a polarity opposite to that of voltage immediately before reset.

10. The inverter according to claim 9, wherein the AC output voltage indicating a sine wave.

11. The inverter according to claim 10, wherein the control means controls the inverter circuit, as a starting point is reset to 0 volt, to restart a normal operation by outputting the AC output voltage indicating the sine wave again.

12. The inverter according to claim 9, wherein the inverter circuit includes:
   a full-bridge-type switching circuit having four switching elements; and
   a pair of independent power supply circuits each connected to each of a pair of high-side switching elements of the four switching elements.

13. The inverter according to claim 9, wherein the inverter circuit includes a full-bridge-type switching circuit having a pair of first switching elements for switching polarity of the AC output voltage and a pair of second switching elements for generating pulse voltage on the basis of the DC input voltage, and
   each of the first switching elements is constructed by a bipolar transistor.

14. The inverter according to claim 9, wherein when the number of times of re-starting in the inverter circuit reaches a predetermined number of times, the control means stops operation of the inverter circuit.

15. The inverter according to claim 14, wherein when the number of times of re-starting reaches the predetermined number of times within a fixed period, the control means stops operation of the inverter circuit.

* * * * *